(12) United States Patent
Wilber

(10) Patent No.: US 6,862,605 B2
(45) Date of Patent: Mar. 1, 2005

(54) TRUE RANDOM NUMBER GENERATOR AND ENTROPY CALCULATION DEVICE AND METHOD

(76) Inventor: Scott A. Wilber, P.O. Box 370, Roswell, NM (US) 88202-0370

( * ) Notice: Subject to any disclaimer, the term of this patent is extended or adjusted under 35 U.S.C. 154(b) by 651 days.

(21) Appl. No.: 09/930,072

(22) Filed: Aug. 15, 2001

(65) Prior Publication Data

US 2003/0037079 A1 Feb. 20, 2003

(51) Int. Cl.$^7$ .............................................. G06F 1/02
(52) U.S. Cl. ...................................... 708/255; 708/251
(58) Field of Search ................................ 708/255, 251

(56) References Cited

U.S. PATENT DOCUMENTS

| | | | |
|---|---|---|---|
| 4,545,024 A | 10/1985 | Maher | 364/717 |
| 4,641,102 A | 2/1987 | Coulthart | 328/62 |
| 4,799,259 A | 1/1989 | Ogrodski | 380/46 |
| 4,959,832 A * | 9/1990 | Bardell, Jr. | 714/739 |
| 5,117,380 A | 5/1992 | Tanagawa | 364/717 |
| 5,434,806 A | 7/1995 | Hofverberg | 364/717 |
| 5,602,845 A * | 2/1997 | Wahl | 370/395.7 |
| 5,627,775 A | 5/1997 | Hong | 364/717 |
| 5,706,218 A | 1/1998 | Hoffman | 364/717 |
| 5,781,458 A | 7/1998 | Gilley | 364/717.06 |
| 5,961,577 A | 10/1999 | Soenen | 708/251 |
| 5,963,104 A | 10/1999 | Buer | 334/78 |
| 6,061,702 A | 5/2000 | Hoffman | 708/251 |
| 6,065,029 A | 5/2000 | Weiss | 708/251 |
| 6,522,210 B1 * | 2/2003 | Dvorak et al. | 331/78 |
| 6,629,116 B1 * | 9/2003 | Rabeler | 708/250 |
| 6,724,805 B1 * | 4/2004 | Vigoda | 375/130 |
| 2003/0014452 A1 * | 1/2003 | Le Quere | 708/250 |

FOREIGN PATENT DOCUMENTS

EP  0 388 131 B1  3/1990

OTHER PUBLICATIONS

Random Number Generators, 1996, Victor Pettersons Bokindustri Aktlebolag, Stolkholm, Birger Jansson, Ed., pp27–30.
Math–TrulyRandom, 1995, Mitchell, D. (AT&T), and Systemics, Inc., http://www.systemics.com/.
An LSI Random Number Generator (RNG), 1984, Fairfield, R. C., Proc. Advances in Cryptology Conf. on CRYPTO.
Randomness Recommendations for Security, 1994, Eastlake, D., 3rd. http://www.ietf.org/rfc/rfc1750.txt?number=1750.
Crypto.Util.randpool, 2001, Author Unknown http://amk.ca/python/writing/pycrypt/node21.html.

* cited by examiner

Primary Examiner—D. H. Malzahn

(57) ABSTRACT

A random number generator includes a first oscillator that provides a first oscillatory signal to a processor, and a second oscillator that provides a signal to a frequency multiplier, which in turn provides a second oscillatory signal to the processor. The relative jitter between the two oscillatory signals contains a calculable amount of entropy that is extracted by the processor to produce a sequence of true random numbers.

15 Claims, 2 Drawing Sheets

TRUE RANDOM NUMBER GENERATOR AND ENTROPY CALCULATION DEVICE AND METHOD

CROSS REFERENCE TO RELATED APPLICATIONS

Not applicable.

BACKGROUND OF THE INVENTION

1. Field of the Invention

The present invention relates to random number generators and more specifically to true or non-deterministic random number generators.

2. Prior Art

Devices for generating what are called true or non-deterministic random numbers are well known in the art. Examples of true random generators using a low-frequency oscillator and a high-frequency oscillator are described in U.S. Pat. No. 4,641,102 (1987), U.S. Pat. No. 5,781,458 (1998) and U.S. Pat. No. 6,061,702 (2000).

A circuit for generating true random numbers using high- and low-frequency oscillators is described in detail in *An LSI Random Number Generator (RNG)*, Proc. Advances in Cryptology, Conference on CRYPTO, 1984, by Fairfield, Mortenson and Coulthart. The circuit described therein uses a noise component in the low-frequency signal as the source of entropy.

None of the previously available random number generators or methods have disclosed any way of calculating or knowing the actual amount of entropy available in the generated random sequences. Some prior art suggests brute force approaches, wasting perhaps hundreds of bits of entropy for each output bit. Other prior art produces sequences with less than one bit of entropy per output bit. This is a mixed true—pseudorandom generator of indeterminate properties.

Authors have suggested methods of generating true random numbers using components normally available on personal computers. These include deriving entropy from keyboard stroke timing, computer mouse movements, and air turbulence in the hard disk drive. Some discussion of such methods is given, for example, in *Randomness Recommendations for Security*, 1994, by Eastlake, Crocker and Schiller, at a web site with the following address: http://www.ietf.org/rfc/rfc1750. txt?number=1750. While these methods may be a source of entropy, the generation rates are very low and intermittent. Some of these methods require the interaction of a human operator making them unsuitable for most practical uses of random numbers.

All true random number generators require a physical source of entropy to produce random numbers, as distinct from algorithmically generated pseudorandom numbers, which are deterministic by nature of their source. The requirement for a physical generator has limited the availability of high quality, true random numbers due to cost, size, power requirements or difficulty in interfacing with the user's equipment.

A significant limitation of prior true random number generators is the uncertainty in the actual entropy and quality of the random numbers produced. Direct testing of a random sequence does not assure universally acceptable results in all applications, as different types of defects may not show up in a certain set of tests. Also, direct testing may be impractical due to the large number of bits—hence time—required to test to the required level of significance.

Systems for scrambling bits or correcting defects in random number sequences are also known in the art. Examples of these are contained in U.S. Pat. Nos. 5,963,104 (1999) and 6,061,702 (2000). Randomness defect correction can also be accomplished by encryption methods, such as DES.

It is important to know that randomness defect correction, or bit scrambling, does not in any way add entropy to the output sequence. Only the actual number of bits of entropy input to any deterministic algorithm can be taken as true random output bits from such an algorithm.

Randomness defect correctors and bit scramblers generally do not have proven, theoretical properties, which has resulted in unknown or unpredictable properties and quality of the random sequences produced by them. Also, not knowing the true entropy content in a random sequence that is used in cryptographic applications may lead to vulnerability to attack, especially by a quantum computer when one becomes available.

SUMMARY OF THE INVENTION

The device and method of the present invention generates true random number sequences of calculable entropy content. The entropy is derived from a random noise component, or transition jitter, in one or both of a low- and a high-frequency signal source that are coupled to a processor for producing the random numbers. The high-frequency signal source includes a frequency multiplier that significantly increases the size of the noise component in the high-frequency signal.

OBJECTS AND ADVANTAGES

Accordingly, several objects and advantages of the present invention are:

(a) to provide a random number generator that is particularly suited for rapid production of true random numbers of known, high quality on a personal computer using only the standard hardware provided on most such computers;

(b) to provide a random number generator of minimum complexity and cost;

(c) to provide a random number generator that optimally utilizes the available entropy, thereby maximizing the rate of random number generation;

(d) to provide a very general method for calculating the available entropy in true random number generators;

(e) to provide a specific method for reducing the defects in the randomness properties of a sequence of random numbers which is easily implemented in an integrated circuit or in a computer program;

(f) to provide a general method for reducing the defects in the randomness properties of a sequence of random numbers so that they will be generally applicable to any use;

Still further objects and advantages will become apparent from a consideration of the ensuing description and drawings.

DETAILED DESCRIPTION OF THE PRESENT INVENTION

Figure 1:
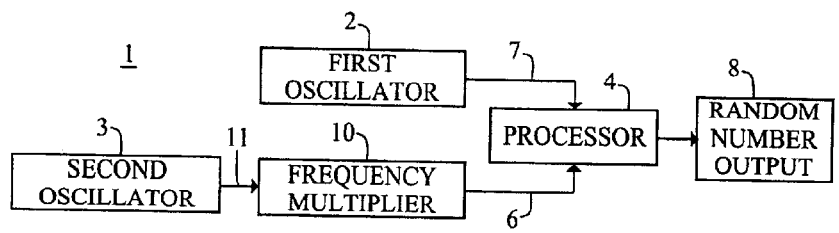
FIG. 1 is a block diagram illustrating a general embodiment of a true random number generator of the present invention.
Figure 2:
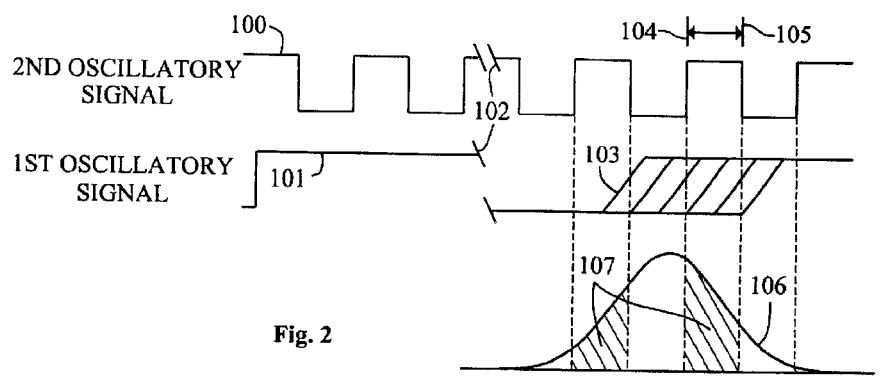
FIG. 2 is a diagram showing oscillatory signals plus transition jitter, illustrating the method of calculating entropy of the present invention.
Figure 3:
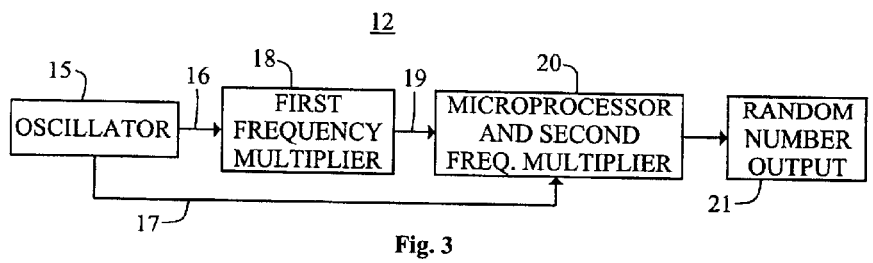
FIG. 3 is a block diagram illustrating one embodiment of a true random number generator of the present invention included in a personal computer.
Figure 4:
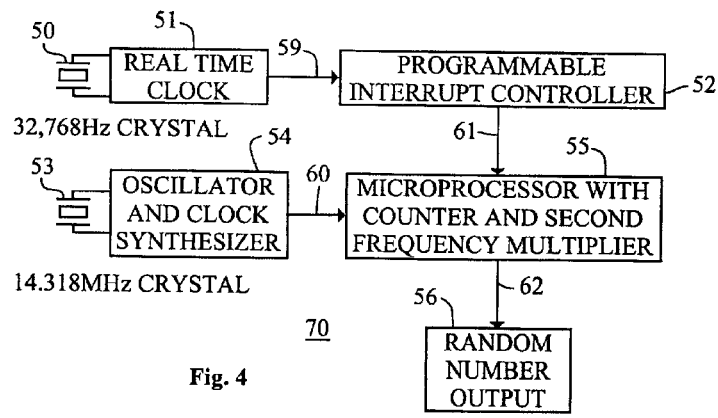
FIG. 4 is a block diagram illustrating another embodiment of a true random number generator of the present invention included in a personal computer.

A random number generator and method is described with numerous specific details such as components, oscillator frequencies and mathematical equations, in order to provide a thorough understanding of the present invention. It will be obvious to one skilled in the art that these specific details are not required to practice the present invention.

FIG. 1

A random number generator 1 includes a first oscillator 2 and a second oscillator 3. These oscillators are typically implemented using simple logic elements such as CMOS inverting gates, resistive and capacitive elements, and crystal resonators, as in the case of crystal oscillators. The construction of this and other similar types of oscillators is well known in the art. The term oscillator as used here, indicates a source of oscillatory or time-varying signals. Amplified thermal noise, Schott noise, and quantum mechanical noise generated by radioactive decay or single-photon detection are examples of other sources of oscillatory signals that can be used in the random number generator of FIG. 1.

A second oscillatory signal from the second oscillator is connected by a line 11 to a frequency multiplier 10. The frequency multiplier may be implemented using many different well-known techniques. The particular technique depends somewhat on the nature of the input oscillatory signal. For a binary signal, a phase locked loop frequency multiplier may be employed. Also, a simple logic method employing a sequence of exclusive-or gates with a resistor-capacitor time delay of the appropriate value in one of each of their inputs will double the frequency at each exclusive-or stage. If the input signal is of an analog type such as would be generated by thermal noise, a broadband nonlinear multiplier could be used. The frequency multiplier can multiply the input signal frequency by up to many thousands.

The output of the frequency multiplier is connected to a processor 4 by a line 6. The output of the first oscillator is also connected to the processor by a line 7. The processor in its simplest form is a binary counter that is incremented on a zero crossing, or positive-going transition, of the output from the frequency multiplier. The value in the counter is read on each positive transition of the output from the first oscillator. The least significant bit of the counter is then used as one number is a sequence of a random number output 8.

There are numerous methods of processing the two oscillatory signals to produce random numbers. One of these uses multiple bits from the counter value, each of which contains some independent entropy, and subsequently processing the multiple bits to recover nearly all the available entropy. Another method compares the values from two sequential counter readings and outputs a 1 or 0 depending on which reading is larger.

In FIG. 1 and all other figs., a line can mean a wire, a computer bus or any other means whereby an electronic signal is conveyed from one point to another.

FIG. 2

A perfect sequence of true random numbers contains exactly one bit of entropy for each bit in the sequence. If the entropy content is less than one bit per bit, the sequence is not a true random sequence, but a mixture of true and pseudorandom components.

An understanding of the entropy source process, including an accurate and general mathematical model, is required in order to know the actual entropy content of a random number sequence embodying that entropy.

A first and a second oscillatory signal, 101 and 100 respectively are shown in the form of square waves. One of the oscillatory signals, in this example, the second oscillatory signal, is used for timing and is of a periodic nature. The first oscillatory signal can be derived from a number of possible signal sources including thermal noise in resistive elements, Schott noise in transistors and diodes, quantum mechanical noise in nuclear decay or single-photon processes, and chaotic noise such as found in air turbulence. The noise source is then converted to a binary form for processing, but the sometimes-huge cycle-to-cycle variations in this binary representation would not appear to be periodic at all.

The first step needed to calculate the entropy from the two oscillatory signals is to determine the value of transition jitter in each of the signals. This is done by a combination of direct measurements and theoretical modeling depending on the particular sources of the oscillatory signals. Nuclear decay produces an easily measurable average rate and a theoretically known statistical distribution of decay timing. Crystal oscillators have cycle-to-cycle jitter characteristics that are measured by special instruments designed for that purpose. The distribution of a crystal oscillator jitter is nearly Gaussian, and the jitter values for particular crystals can be obtained from, or calculated from information in the manufacturers' specification sheets. For example, the jitter specifications for the output of oscillator/clock synthesizers used in personal computers are measured by their manufacturers and published in the relevant specification sheets.

The second step is combining the independent transition values into one effective value. It must be noted that the total transition jitter between two signals is relative, that is, the jitter in both signals may be combined and represented as only existing in one of the signals, without the loss of generality or accuracy in the results. For reasons of simplicity and consistency, the total or effective jitter will always be represented as a component of the lower-frequency signal, in this example, first signal 101. The jitter values must first be properly adjusted before they can be combined. For Gaussian signals, this is done by multiplying the jitter value in the higher-frequency oscillatory signal, in this example, second signal 100 by the square root of the ratio of the average frequencies of the second and first oscillatory signals respectively. The adjusted jitter value can be combined with the first jitter value by adding in quadrature, that is, squaring each value and taking the square root of their sum.

If the adjusted jitter value of the second oscillatory signal is relatively small compared to that of the first oscillatory signal, the jitter of the second oscillatory signal may be omitted from the effective jitter value. A second jitter value that is 20% of a first jitter value will contribute only about 2% to the effective value. Assuming a zero value for the second oscillatory signal can greatly simplify the entropy calculations, especially when the statistical distributions of the two oscillatory signals are different. This simplification will cause the calculated entropy value to be slightly lower than the actual entropy.

The next step is simply to divide the effective jitter value by the period of the second oscillatory signal to produce a normalized jitter value. This step simplifies the final calculations. The normalized jitter is illustrated as diagonal lines 103 representing the indeterminacy of the transition time of the first oscillatory signal. The breaks in each signal 102 indicate that not all cycles of each signal are shown in the Fig. since there may be thousands of cycles in the second oscillatory signal for each period of the first oscillatory signal.

The next step is to calculate the average probability of correctly predicting that the second oscillatory signal will be in the high state, or 1, at a positive transition of the first oscillatory signal. A single calculation of the probability of correctly predicting a high value is made by integrating the probability distribution function (PDF) 106 of the effective jitter in the first oscillatory signal that coincides with all periods where the second oscillatory signal is in the high state. Hatched areas 107 in the PDF represent these coinciding periods. The PDF 106 is illustrated as a Gaussian distribution; however, the actual distribution function representing the statistics of the jitter in the first oscillatory signal is used for the calculation. The center of the PDF is placed at the expected positive transition time of the second oscillatory signal.

The average probability of correctly predicting a high value, p(1), may be calculated numerically by averaging the results of a large number of single probability values. The single probability values are calculated at uniformly distributed placements of the PDF across a single positive half-cycle of the second oscillatory signal, starting at the rising edge 104 and ending at the falling edge 105. One skilled in the art of mathematics can readily determine the minimum number of single probability values necessary to achieve a particular accuracy in this calculation.

The final step is to utilize the average probability, p(1), to calculate the available entropy. To state the equation in its simplest form, note that the average probability of correctly predicting a low state or 0 is simply p(0)=1.0–p(1). These two probabilities are used in Shannon's equation for entropy, H:

$$H=-(1.0/Ln\ 2.0)(p(1)\ Ln\ p(1)+p(0)\ Ln\ p(0)),$$

where Ln represents the natural log. The optimum value of the duty cycle of the second oscillatory signal is 50%. Any increase or decrease in this value affects the average probability, p(1), producing a 1/0 bias in the output sequence thereby reducing the available entropy.

The method for calculating available entropy will be further illustrated by means of a specific example: A crystal oscillator operating at 14.318 MHz supplies a second oscillatory signal. The cycle-to-cycle root mean square (rms) jitter of this oscillator is about 0.001 times its period, or 70 ps rms. This value is taken from published articles describing direct measurements made with special equipment designed to measure the noise spectrum in such oscillators, wherefrom the jitter can be calculated. A resistor/capacitor, or RC, CMOS oscillator produces a first oscillatory signal with a frequency of 1.02 KHz. The jitter in this oscillator may be measured with a readily available spectrum analyzer and is about $7\times10^{-6}$ times the period of the RC oscillator, or about 7 ns rms. The rms jitter of the RC oscillator can also be measured by observing the peak-peak jitter on an oscilloscope. The rms jitter is about one-sixth to one-seventh of the peak-peak jitter.

The jitter in the crystal oscillator is multiplied by the square root of 14318/1.02, which gives an adjusted jitter value of 8.3 ns rms. The next step is to combine the rms jitter of both oscillators. This is done by squaring each component and taking the square root of their sum. The resulting effective jitter is 10.86 ns rms. Dividing by the period of the HF oscillator normalizes the effective jitter, which in this example is 69.8 ns. The result of this normalization step is the dimensionless ratio, 0.156. The distributions of both oscillators is approximately Gaussian, yielding a Gaussian distributed effective jitter on the first oscillatory signal, with a standard deviation of 0.156 of the second oscillatory signal period.

The next step is to calculate the average probability, p(1). The following Mathematical program will illustrate this approach wherein: prob gives the probability of correctly predicting a single transition of the first oscillatory signal at a particular phase, mu, in the second oscillatory signal cycle using a given normalized jitter, rho; and avgprob numerically calculates the average of the prob function across one positive half cycle of the second oscillatory signal.

prob[mu_, rho_]:=Sum[CDF[NormalDistribution[mu, rho], $x$+0.5]−CDF [NormalDistribution[mu, rho], $x$], {$x$, −1. Round[6 rho], 1. Round[6 rho]}]

avgprob[rho_]:=If [rho>0.9, 0.5, N[2.

Sum[prob[mu, rho], {mu, 0., 0.5, 1./1000.}]/501.

−Sum[prob [mu, rho], {mu, 0., 0.5, 1./500.}]/251.]]

The result of this calculation is .p(1)=0.75, and therefore, p(0)=0.25.

The final step is to use the calculated average probabilities, p(1) and p(0), to calculate the actual entropy, H, as illustrated in the Mathematica program:

$H[p1\_,\ p0\_]:=(-1./Log[2.])\ (p1\ Log[p1]+p0\ Log[p0])$

The result of the entropy calculation wherein p1=p(1) and p0=p(0), is H=0.81 bits. This means that a random number generator composed of a counter being clocked by the second oscillator with the counter's least significant bit (LSB) being latched as output bits by the first oscillator's positive transitions will produce a sequence with an average entropy of 0.81 bits per output bit. This 0.81 bits is not the total available entropy: each bit in the counter of this example also contains entropy. The amount of entropy in each bit can be calculated by dividing the normalized jitter value by 2 to the power n, where n starts at 0 for the LSB and increases by one for each succeeding bit. The second bit in the counter produces a sequence of bits with entropy calculated from a normalized jitter of 0.165/2.=0.0825, yielding an entropy value of 0.56 bits. Taking the entropy from each of the lower six bits of the counter gives a total available entropy of 2.06 bits. These six bits must be subsequently processed to extract their entropy to produce a sequence of true random numbers. Only about two bits will be returned for every six bits processed, since that represents all the available entropy.

The method of calculating the average probability, p(1), relies on the assumption that the ratio of the second oscillator frequency divided by the first oscillator frequency is an irrational number, or at least not an integer or a rational fraction containing small integers. This means that the rising edge of the first oscillatory signal will be nearly uniformly distributed across the cycles of the second oscillatory signal during the course of many cycles of the first oscillatory signal. If this condition is not met, the available entropy, and any entropy available in bits higher than the LSB may be significantly reduced. It is therefore desirable to select frequencies of the two oscillatory signals that give a ratio as far as possible from an integer or a rational fraction containing small integers. One exception to this rule is when the two oscillatory signals have exactly the same frequency and their average phase difference is zero degrees. This will result in a theoretical entropy of 1.0 bits in the LSB even for very small normalized jitter values, since p(1) is always exactly 0.5.

FIG. 3

A personal computer 12 of the usual type includes an oscillator 15 a first frequency multiplier 18 and a microprocessor 20. The oscillator of this embodiment is the reference oscillator which is a crystal oscillator having a frequency of about 14.318 MHz. The oscillator is connected to the first frequency multiplier by a line 16. The frequency multiplier produces several different frequencies for use in the personal computer, including a front side bus (FSB) frequency that ranges from about 66.67 MHz upward in increments of 33.33 MHz. The FSB is subsequently connected to the microprocessor by a line 19. The microprocessor includes as part of its integrated circuit a second frequency multiplier that multiplies the FSB up to the microprocessor core clock frequency. The microprocessor core clock frequency ranges from about 100 MHz to one or more GHz, depending on the type of microprocessor. A line 17 connects a signal that is also derived from the reference oscillator to the microprocessor. The microprocessor utilizes both the core clock and the signal derived from the reference oscillator to produce an output sequence of true random numbers 21. The rate of entropy generation will be at least 200 bits per second.

FIG. 4

A personal computer 70 of the usual type includes a first oscillator included in a real time clock 51. The real time clock (RTC) oscillator is controlled by a crystal 50 to produce a frequency of about 32,768 Hz. This frequency is subsequently divided in the RTC to a maximum output frequency of 8192 Hz. The 8192 Hz or low-frequency signal is applied by a line 59 to the input of a programmable interrupt controller 52.

The personal computer also includes a second oscillator that is independent of the first oscillator. The second oscillator is crystal controlled by a crystal 53 to produce a reference frequency of about 14.318 MHz. The reference frequency oscillator is included in a combined oscillator and clock synthesizer 54. The clock synthesizer includes a first frequency multiplier that multiplies the reference frequency to a front side bus (FSB) or medium-frequency signal of about 66.67 MHz or higher in increments of 33.33 MHz. The clock synthesizer also includes other frequency multipliers and dividers which provide additional signals used by the personal computer.

The FSB signal is provided to the personal computer's microprocessor 55 by a line 60. The microprocessor includes a second frequency multiplier that multiplies the FSB frequency to the microprocessor core clock or high-frequency signal, which ranges from about 100 MHz to above 1 GHz. The core clock frequency is applied to a counter included in the microprocessor that counts each cycle of the core clock signal.

The output of the programmable interrupt controller is applied to the microprocessor by a line 61 and the microprocessor responds by reading the count in the counter. The microprocessor then processes the count to produce a sequence of true random numbers that is sent to a random number output 56 on a line 62.

The oscillator in the real time clock is used for illustrative purposes and is not meant to limit the possible sources of the low-frequency signal to that component. Other possible sources of the low-frequency signal include an oscillator in one of the following: a display card, an audio card, a network card, a modem, and a serial port card. In the preferred embodiment, the ratio of the high- to low-frequency signals is at least 10,000 and ranges up to over 122,000. The entropy available is well above 200 bits per second and can go higher than 20,000 bits per second.

FIG. 5

All true random number generators initially produce sequences with defects in their randomness properties. A true random number generator (RNG) with defects 120 produces a defect-containing sequence of numbers that are applied by a line 111 to the second input of a second exclusive-or gate 122. The first input of the second exclusive-or gate is connected by a line 136 to the output of a first exclusive-or gate 135. Line 136 also provides a defect-reduced output sequence 140. Three shift registers with lengths 9, 10, and 11, 128, 129, and 130 respectively, are made into circular buffers by returning their outputs on lines 132, 133, and 133 respectively to their inputs through data selectors 123, 124, and 125 respectively. The three circular buffers also provide their outputs to the three inputs of exclusive-or gate 135 wherein they are combined into one defect-reduced number. The circular buffers operate in a fashion equivalent to addressing each of three circular buffers in a memory system and reading the contents stored in the memory at each address.

A line 126 connects the RNG to a control clock generator 121 which generates signals to control the timing of the circular buffers and data selectors, and synchronize these functions with the RNG's output. A clock signal is connected by a line 127 to all three circular buffers to increment each of their addresses each time a new result is available at the output of the second exclusive-or gate. This result is provided to one input of each of the three data selectors by a line 131. Two of the three data selectors route the outputs of their associated shift registers back to their inputs to make them into circular buffers. The remaining data selector routes the output of the second exclusive-or gate into the input of one of the remaining shift register, thereby replacing the numbers stored therein until each number in the shift register has been replaced. The control clock generator then signals the next data selector to begin routing the output from the second exclusive-or gate into the next shift register. The data selectors are separately controlled by signals connected to each of them by lines 137, 138, and 139 which continue to route a new number into one location of one circular buffer for each defect-reduced output number.

The number and length of circular buffers were chosen to be small to simplify the illustration of the method of statistical defect reduction. Additional circular buffers will produce greatly improved results, up to about 8 buffers. Using more than about 8 buffers will not produce detectably different results. The lengths of the buffers must be relatively prime to produce best results. For fewer buffers, greater lengths will give better results.

Figure 5:
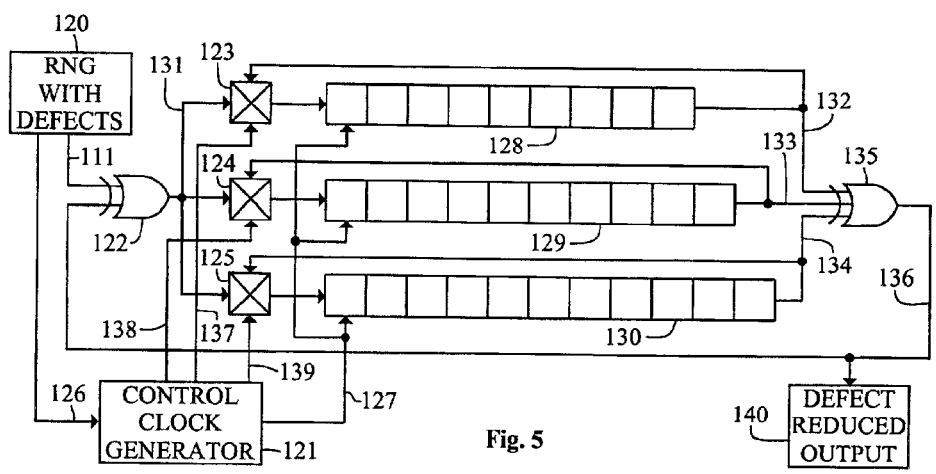
FIG. 5 is a block diagram illustrating one method of the present invention for reducing defects in a random sequence.

For simplicity of this description, a single-bit process is illustrated in FIG. 5. The method herein described is equally applicable to correcting defect-containing numbers of any word-length. This methods are also self-initializing. The defect-reduced output sequences will produce optimal statistical properties of randomness after all the numbers in each circular buffer have been replaced about 10 times.

This method may also be used to perfect the statistical properties of pseudorandom number generators since the defect-reduced output sequence has extremely good statistical properties of randomness.

An implementation of the illustrated method can easily be produced for use in an integrated circuit or by using discrete logic components. All the elements shown in FIG. 5 can be replaced by the equivalent logic circuit except for the control clock generator. The control clock generator consists of a pre-loadable down counter with its output connected to a divide by three counter with decoded outputs. Each of the three decoded outputs is connected to one of the three data selectors as well as to one of three memory elements containing the lengths of each circular buffer. The pre-loadable counter is loaded from the appropriate memory element with a number corresponding to the length of the circular buffer whose numbers are to be replaced. The counter counts down one for each output number until it reaches zero. When zero is reached, the divide by three counter is incremented and the number of the next circular buffer is pre-loaded into the down counter. The shift registers are incremented for each new output after a short delay to allow the data to stabilize at their inputs. This design can easily be extended to any number and length of circular buffer.

FIG. 6

A true random number generator (RNG) with defects 200 produces a defect-containing sequence of numbers that are applied by a line 201 to the second input of an exclusive-or gate 206. A pseudorandom number generator 203 produces a random number with a seed produced by the exclusive-or gate and applied by a line 202 to the pseudorandom number generator. The generator produces an output that is sent by a line 205 as one number in a defect-reduced output 204. This same defect-reduced number is also applied to the first input of the exclusive-or gate. A new defect-containing number is applied to the exclusive-or gate for each defect-reduced output number to produce a new seed to produce a new defect-reduced number, and so by repeating the process, will produce a defect-reduced output sequence of any desired length.

Figure 6:
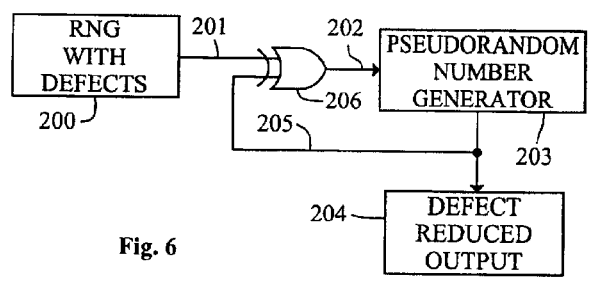
FIG. 6 is a block diagram illustrating another method of the present invention for reducing defects in a random sequence.

The method herein described with respect to FIG. 6, is equally applicable to correcting defect-containing numbers of any word-length. The method is self-initializing. After only a few defect-containing numbers have been processed, the defect-reduced output sequences will produce optimal statistical properties of randomness.

Advantages

From the above description, a number advantages of my true random number generator and method become evident:

(a) True random number generators containing very simple, small, and inexpensive components can be built that will produce random sequences with quantified entropy content. These characteristics allow the easy, widespread use of true- rather than pseudorandom generators in situations where they would not have previously been used.

(b) True random numbers can be rapidly and reliably generated on personal computers without adding any additional hardware. This makes true random numbers of provable high quality available to almost anyone with a personal computer, merely by installing a software package that can be immediately downloaded from the Internet at a very low cost.

(c) Random number sequences containing statistical defects can be corrected so that the resulting sequences have effectively perfect randomness properties. This allows the corrected sequences to be used with confidence in any application requiring randomness. Such provable high quality in random sequences has previously been complex and expensive to obtain.

Conclusion, Ramifications and Scope

Randomness is a very subtle concept that has not at present been precisely defined in mathematical or technical terms. Many users of random numbers have little understanding of the fundamentals of entropy and true random number generation. Consequently much time and resources have been wasted by using random number sequences of insufficient quality. This lack of precise definition and quantifiability has caused some researchers to produce erroneous results without their knowledge, or encrypted data to be compromised, potentially resulting in significant losses.

Accordingly the reader will see that random number generators practiced according to the present invention will close the loopholes of quality and complexity in currently available random number generators, and make virtually perfect random numbers available to nearly everyone at extremely low cost.

The availability of such high quality random numbers is increasingly more important in this age where information, information flow, and information processing has become a significant sector of both our economy and culture.

Although the description above contains many specificities, these should not be construed as limiting the scope of the present invention, but merely as providing illustrations of some of the presently preferred embodiments of this invention. For example, the internal structure of personal computers may change in many ways, such as including more of the functions that are currently contained on separate boards or circuitry into a smaller set of more complex integrated circuits. The bus structure and the frequencies employed therein may also change as microprocessors and other components become faster and faster.

Thus the scope of the invention should be determined by the appended claims and their legal equivalents, rather than by the examples given.

What is claimed is:

1. A true random number generator comprising:
   (a) a first oscillator producing a first oscillatory signal;
   (b) a second oscillator producing a second oscillatory signal;
   (c) a frequency multiplier responsive to said second oscillatory signal;
   (d) a processor responsive to said first oscillatory signal and said frequency multiplier, to produce a sequence of true random numbers.

2. A true random number generator as described in claim 1 wherein said frequency multiplier is selected from the group consisting of: a phase locked loop frequency multiplier, a nonlinear frequency multiplier, and an exclusive-or logic function with unequal time delay elements on its inputs.

3. A true random number generator as described in claim 1 wherein the average output frequency of said frequency multiplier is at least 10,000 times the average frequency of said first oscillatory signal producing means.

4. A true random number generator as described in claim 1 wherein said processor includes a counter which is incremented in response to the output of said frequency multiplier, said counter having a count that is read in response to said first oscillatory signal.

5. A true random number generator comprising:
   (a) a personal computer including an oscillator and a first frequency multiplier responsive to said first oscillator;
   (b) a microprocessor included within said personal computer, said microprocessor including a second frequency multiplier, and responsive to said oscillator and said first and second frequency multipliers to produce a sequence of true random numbers.

6. A true random number generator as described in claim 5 that can produce at least 200 bits of entropy per second.

7. A true random number generator comprising:
   (a) a personal computer, including a first oscillator for producing a low-frequency signal and a second oscillator that is independent of said first oscillator;
   (b) a first frequency multiplier responsive to said second oscillator for producing a medium-frequency signal;
   (c) a programmable interrupt controller included in said personal computer responsive to said low-frequency signal;
   (d) a second frequency multiplier responsive to said medium-frequency signal for producing a high-frequency signal;
   (e) a counter responsive to said high-frequency signal;
   (f) a microprocessor including said counter and said second frequency multiplier, and responsive to said programmable interrupt controller and said counter to produce a sequence of true random numbers.

8. A true random number generator as described in claim 7 wherein said first oscillator is included in one of the personal computer components selected from the group consisting of: a real time clock, a display card, an audio card, a network card, a modem, and a serial port card.

9. A true random number generator as described in claim 7 wherein the average output frequency of said high-frequency signal is at least 10,000 times the average frequency of said low-frequency signal.

10. A true random number generator as described in claim 7 that can produce at least of 200 bits of entropy per second.

11. A method of generating true random numbers comprising:
   generating a first oscillatory signal;
   generating a second oscillatory signal;
   determining values of transition jitter included in said first and said second oscillatory signals;
   using said values of transition jitter to calculate the entropy available from said first and said second oscillatory signals; and
   processing said first and said second oscillatory signals to extract said entropy in the form of a sequence of true random numbers.

12. The method as described in claim 11 including processing said sequence of true random numbers to reduce defects in the randomness properties of said sequence of true random numbers.

13. The method as described in claim 12 wherein said processing of said sequence of true random numbers to reduce defects is accomplished by:
   establishing three or more circular buffers in a memory system, each of said circular buffers having a length that is relatively prime to all the other buffers;
   reading the contents stored at an address from each of said three or more circular buffers;
   combining said contents into a resultant number using a first exclusive-or function;
   providing said resultant number as one number in a defect-reduced output sequence and also applying said resultant number to the first input of a second exclusive-or function;
   applying a number from the defect-containing random number sequence to the second input of said second exclusive-or function;
   using the resulting number of said second exclusive-or function to replace one of the numbers stored in one of said circular buffers;
   incrementing all the addresses to read from each of said three or more circular buffers, and repeating the steps of reading, combining in said first exclusive-or function and providing a defect-reduced output number, thereby producing a defect-reduced sequence of any desired length and;
   repeating the steps of performing said second exclusive-or function on each new defect-reduced output number with a new defect-containing true random number and
   using the resulting numbers to sequentially replace each of the numbers stored in each of said three or more circular buffers.

14. The method as described in claim 12 wherein said processing to reduce defects in the randomness properties of the true random sequence is accomplished by:
   using a pseudorandom number generator to produce a random number;
   providing said random number as a defect-reduced output number;
   applying said defect-reduced output number to the first input of an exclusive-or function;
   applying a number from a defect-containing true random number sequence to the second input of said exclusive-or function;
   using the output of said exclusive-or function as a seed to be used in said pseudorandom number generator and;
   repeating the step of generating a defect-reduced output number, each time using another number from the defect-containing true random number sequence and the new seed from said exclusive-or function, thereby producing a defect-reduced random output sequence.

15. The method as described in claim 11 wherein calculating the entropy available is accomplished by:
   combining all independent transition jitter values into an effective value;
   calculating a normalized jitter value by dividing said effective value by the period of said second oscillatory signal;
   utilizing said normalized jitter value to calculate an average probability, p(1), that the state of said second oscillatory signal will be high, or 1, when it is predicted to be high at a positive transition of said first oscillatory signal and;
   utilizing said average probability, p(1), to calculate the entropy or H using the equation, $$H = -(1/Ln[2]) \, (p(1) \, Ln[p(1)] + (1-p(1))) \, Ln[1-p(1)]).$$

* * * * *